United States Patent
Heer et al.

(10) Patent No.: US 12,441,455 B1
(45) Date of Patent: Oct. 14, 2025

(54) WING ASSEMBLIES AND AIRCRAFT WITH GAP-ADJUSTMENT ASSEMBLIES FOR SLATS

(71) Applicant: The Boeing Company, Arlington, VA (US)

(72) Inventors: Steven S. Heer, Lake Stevens, WA (US); Ramón A. Burin, Lake Stevens, WA (US); Samuel L. Block, Bothell, WA (US); Kyle S. Wydock, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 19/037,907

(22) Filed: Jan. 27, 2025

(51) Int. Cl.
*B64C 3/50* (2006.01)
*B64C 9/14* (2006.01)
*B64C 9/22* (2006.01)

(52) U.S. Cl.
CPC ............... *B64C 3/50* (2013.01); *B64C 9/22* (2013.01); *B64C 2009/143* (2013.01)

(58) Field of Classification Search
CPC ............................ B64C 3/50; B64C 2009/143
See application file for complete search history.

(56) References Cited

U.S. PATENT DOCUMENTS

| | | | |
|---|---|---|---|
| 4,285,482 A * | 8/1981 | Lewis | B64C 9/24 244/210 |
| 8,292,235 B2 | 10/2012 | Wollaston et al. | |
| 8,511,619 B2 | 8/2013 | Mann | |
| 9,296,473 B2 | 3/2016 | Parker | |
| 2009/0146014 A1* | 6/2009 | Gyuricsko | F16C 23/041 244/213 |
| 2023/0026241 A1* | 1/2023 | Edmunds | B64C 9/14 |
| 2024/0294249 A1* | 9/2024 | Tsai | B64C 9/16 |

* cited by examiner

Primary Examiner — Rodney A Bonnette
(74) Attorney, Agent, or Firm — Kolitch Romano Dascenzo Gates LLC

(57) ABSTRACT

Wing assemblies comprise a slat, wing support structures, and a gap-adjustment assembly configured to permit selective adjustment of the slat relative to the wing support structures. The gap-adjustment assembly comprises a track member and an adjustment member. The track member is pivotally coupled relative to the wing support structures about a track-member axis, the slat is operatively translationally coupled to the track member, and the track member is configured to constrain translation of the slat between a stowed position and a deployed position. The adjustment member is pivotally coupled relative to the wing support structures about an adjustment-member axis and pivotally coupled to the track member about a linkage axis. The adjustment member is configured to permit selective adjustment of a direct distance between the adjustment-member axis and the linkage axis.

20 Claims, 9 Drawing Sheets

WING ASSEMBLIES AND AIRCRAFT WITH GAP-ADJUSTMENT ASSEMBLIES FOR SLATS

GOVERNMENT RIGHTS

This invention was made with government support under contract number 80AFRC22N0008 awarded by NASA. The government has certain rights in the invention.

FIELD

The present disclosure relates to adjustment of slats on aircraft.

BACKGROUND

Slats are high-lift devices used to increase lift during low-speed operations, such as takeoff, initial climb, approach, and landing of an aircraft. Slats are mounted along the leading edges of the aircraft's wings and transition between a stowed position and a deployed position. Gaps between slats and adjacent surfaces of the wings may be critical to the effectiveness of slats when deployed. However, space within the wings for mechanisms to facilitate adjustment of such gaps is often limited in modern aircraft.

SUMMARY

Wing assemblies comprise a slat, wing support structures, and a gap-adjustment assembly that is configured to permit selective adjustment of the slat relative to the wing support structures. The gap-adjustment assembly comprises a track member and an adjustment member. The track member is pivotally coupled relative to the wing support structures about a track-member axis, the slat is operatively translationally coupled to the track member, and the track member is configured to constrain translation of the slat between a stowed position and a deployed position. The adjustment member is pivotally coupled relative to the wing support structures about an adjustment-member axis and also is pivotally coupled to the track member about a linkage axis. The adjustment member is configured to permit selective adjustment of a direct distance between the adjustment-member axis and the linkage axis.

DESCRIPTION

Figure 1:
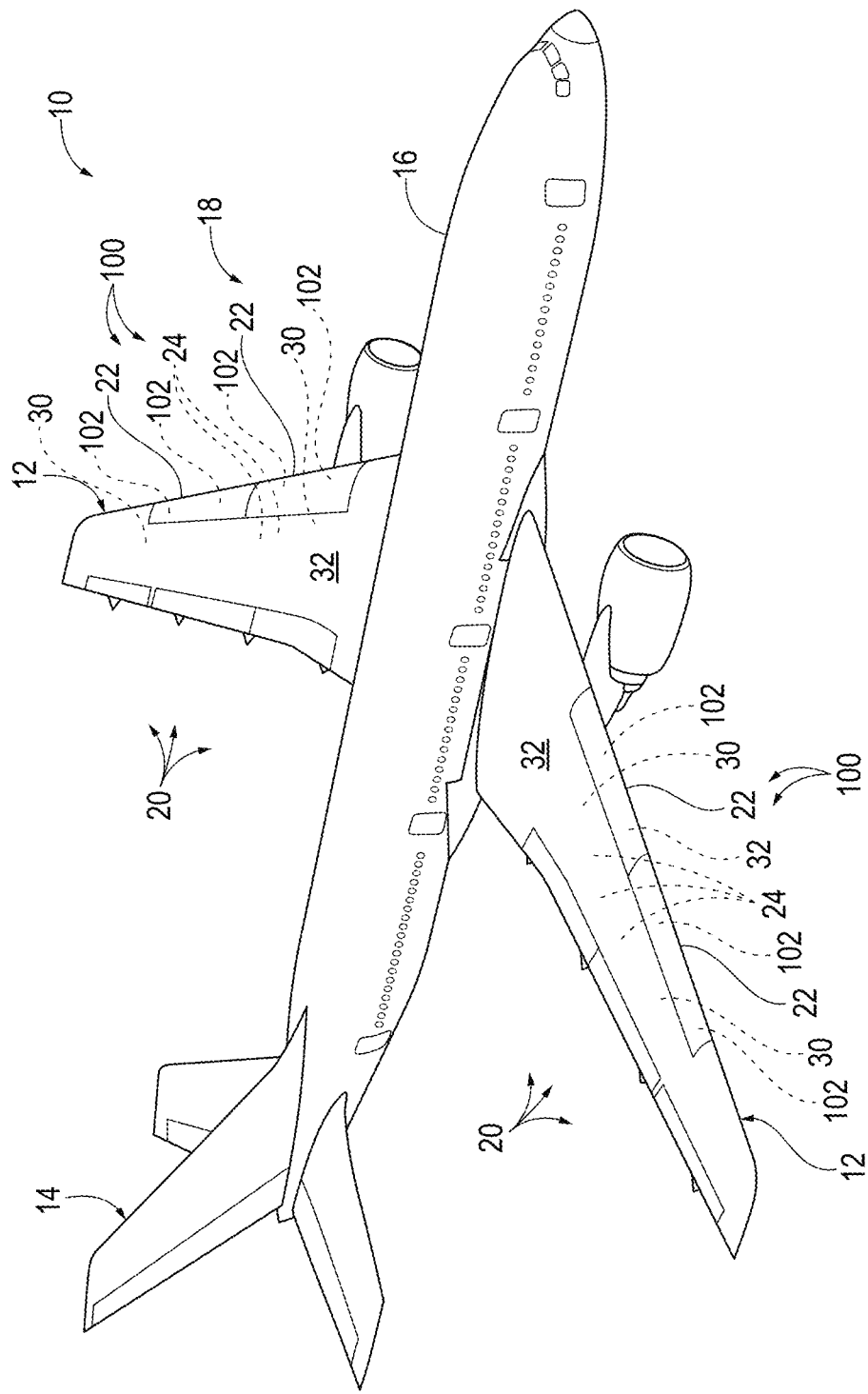
FIG. 1 is an illustration of an example aircraft.
Figure 2:
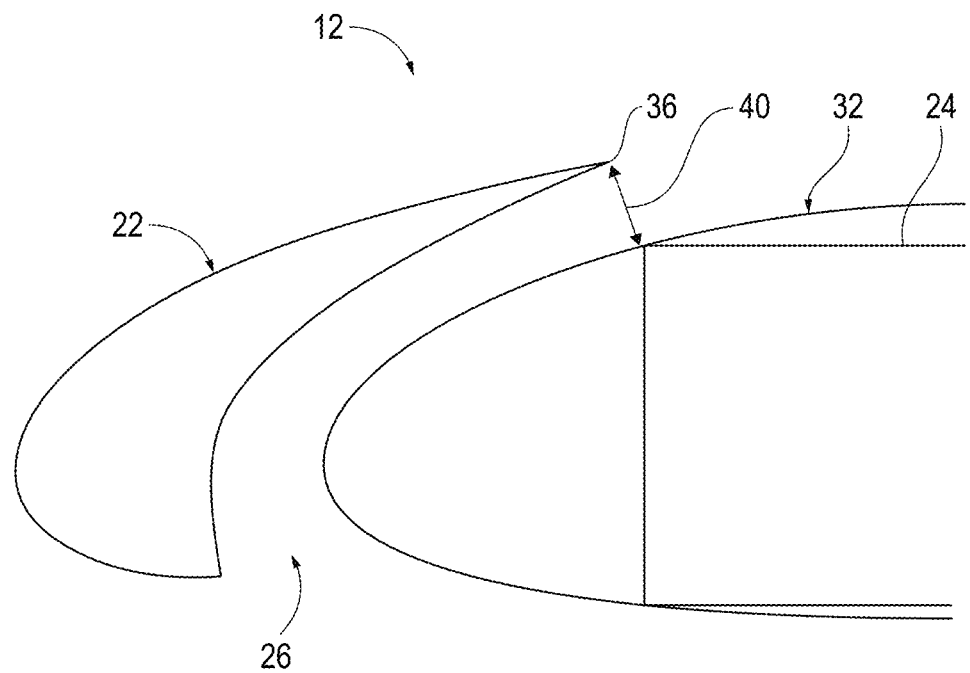
FIG. 2 is a schematic representation of a wing with a slat in a stowed position.
Figure 3:
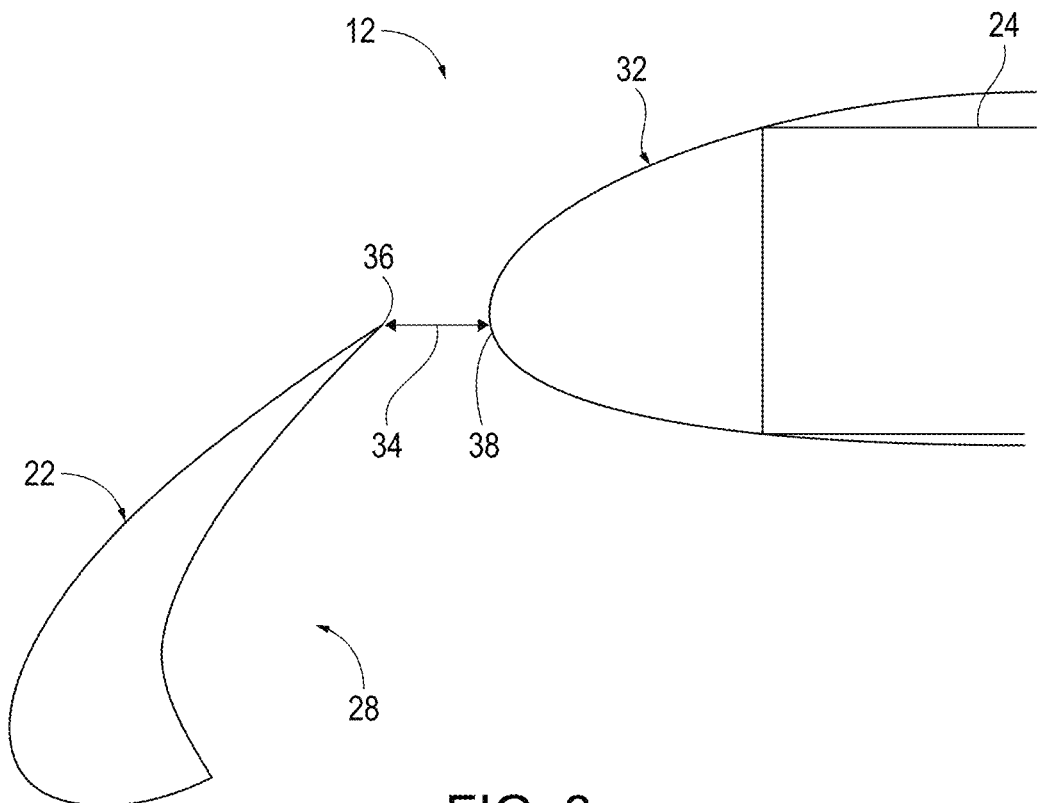
FIG. 3 is a schematic representation of a wing with a slat in a deployed position.

FIG. 1 is a schematic representation of an aircraft 10 that may comprise wing assemblies 100 according to the present disclosure. While aircraft 10 is depicted as a fixed-wing airliner, aircraft 10 and wing assemblies 100 according to the present disclosure are not limited to such examples, and aircraft 10 may be fixed wing aircraft, commercial aircraft, military aircraft, passenger aircraft, autonomous aircraft, rotorcraft, etc. Aircraft 10 typically includes wings 12 and a tail 14 that are supported by a fuselage 16 to form and/or define an airframe 18. The wings 12 include a plurality of flight control surfaces 20, including slats 22, that are configured to be selectively moved relative to wing support structures 24 of the wings 12. Slats 22 are high-lift devices used to increase lift during low-speed operations, such as takeoff, initial climb, approach, and landing of an aircraft 10. Slats 22 are mounted along the leading edges of the wings 12. With reference to FIGS. 2 and 3, slats 22 are configured to be operatively transitioned between a stowed (or retracted) position 26 and a deployed (or extended) position 28.

Examples of wing support structures 24 include spars, ribs, or other underlying framework of a wing 12. A slat 22 is operatively coupled to one or more wing support structures 24 by one or more slat actuation assemblies 30 that are operatively coupled between one or more wing support structures 24 and the slat 22 and that are configured to operatively deploy the slat 22. Wing assemblies 100 according to the present disclosure also include one or more gap-adjustment assemblies 102 that are configured to permit for selective adjustment of gaps between a slat 22 and the adjacent fixed airfoil surface 32. In particular, the gap-adjustment assembly 102 is configured to permit for selective adjustment of a gap 34 between the trailing edge 36 of the slat 22 and the leading edge 38 of the fixed airfoil surface 32 when the slat 22 is in the deployed position 28, as schematically represented in FIG. 3. Gap-adjustment assemblies 102 also may be configured to permit for selective adjustment of a gap 40 between the trailing edge 36 of the slat 22 and the fixed airfoil surface 32 when the slat 22 is in the stowed position 26, as schematically represented in FIG. 2.

Figure 4:
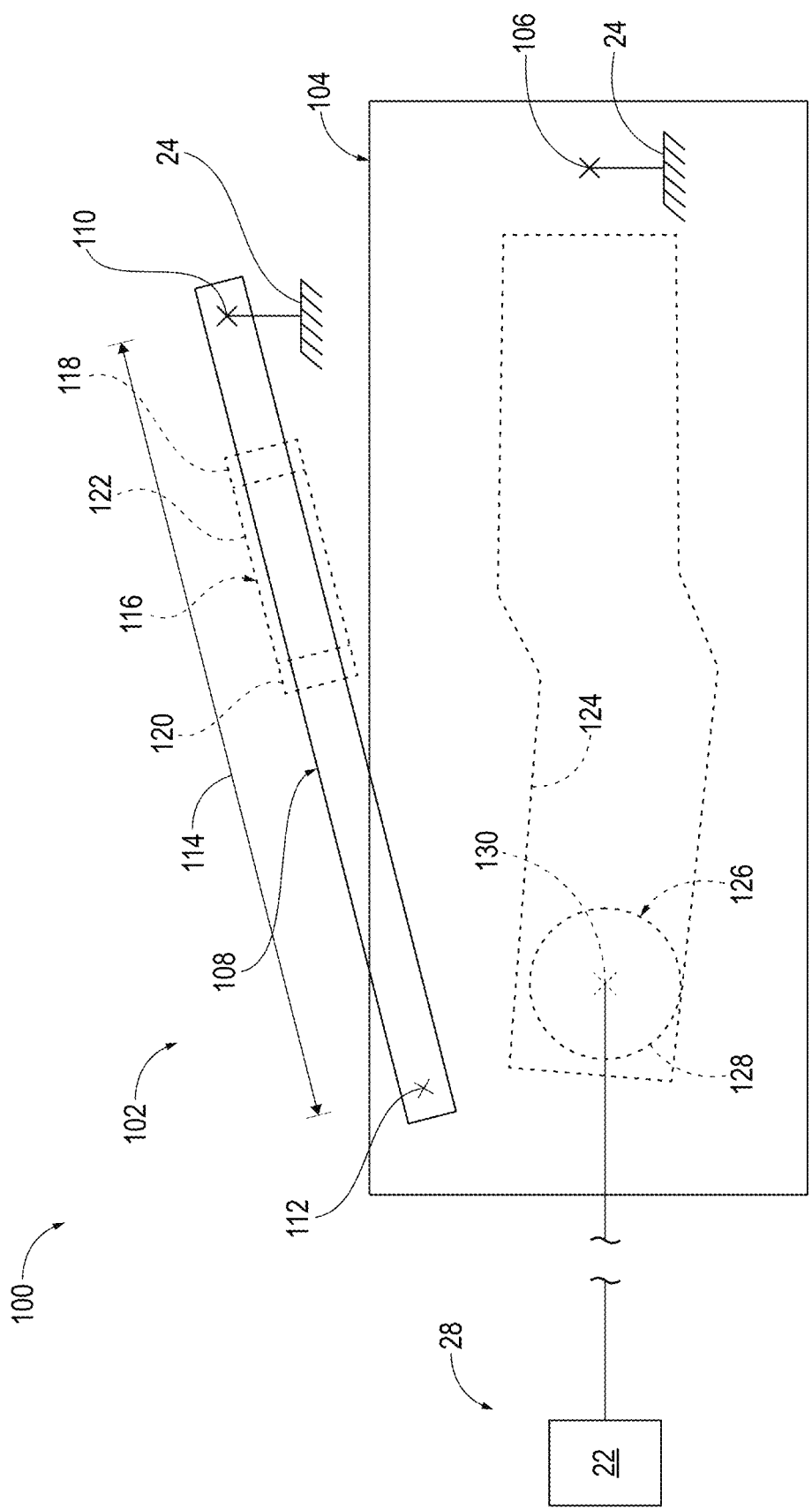
FIG. 4 is a schematic illustration representing wing assemblies with gap-adjustment assemblies according to the present disclosure.

Turning now to FIG. 4, wing assemblies 100 and aircraft 10 according to the present disclosure are schematically represented with a slat 22 in the deployed position 28. Generally, in FIG. 4, elements that are likely to be included in a given example are illustrated in solid lines, while elements that are optional or that correspond to a specific example are illustrated in broken lines. However, elements that are illustrated in solid lines are not essential to all examples of the present disclosure, and an element shown in solid lines may be omitted from a particular example without departing from the scope of the present disclosure.

As schematically illustrated, wing assemblies 100 generally comprise at least a slat 22, wing support structures 24, and a gap-adjustment assembly 102. The gap-adjustment assembly 102 is configured to permit selective adjustment of the slat 22 relative to the wing support structures 24, and thus relative to an adjacent fixed airfoil surface 32, as discussed above. The gap-adjustment assembly 102 comprises a track member 104 and an adjustment member 108. The track member 104 is pivotally coupled relative to the wing support structures 24 about a track-member axis 106. The slat 22 is operatively translationally coupled to the track member 104, and the track member 104 is configured to constrain translation of the slat 22 between a stowed position 26 and a deployed position 28. That is, the track member 104 at least partially defines the stowed position 26 and the deployed position 28. While not part of the gap-adjustment assembly 102, wing assemblies 100 typically also comprise an actuation assembly 30, such as comprising a linear or rotary actuator, that causes the slat 22 to move between the stowed position 26 and the deployed position 28, while the track member 104 constrains that movement to a desired path.

With continued reference to FIG. 4, the adjustment member 108 is pivotally coupled relative to the wing support structures 24 about an adjustment-member axis 110. The adjustment member 108 also is pivotally coupled to the track member 104 about a linkage axis 112. The adjustment member 108 is configured to permit selective adjustment of a direct distance 114 between the adjustment-member axis 110 and the linkage axis 112. Because the adjustment-member axis 110 is fixed relative to the wing support structures 24 and because the linkage axis 112 is fixed relative to the slat 22, adjustment of the direct distance 114 adjusts a gap between the slat 22 and an adjacent fixed airfoil surface 32 of the wing 12.

In some examples, the gap-adjustment assembly 102 is further configured to permit selective adjustment of a location of the track-member axis 106 relative to the wing support structures 24. Such a configuration may be appropriate for adjustment of a location of the slat 22 when the slat 22 is in the stowed position 26.

As schematically represented in FIG. 4, in some examples, the adjustment member 108 comprises an adjustment mechanism 116 that is configured to permit selective adjustment of the direct distance 114 between the adjustment-member axis 110 and the linkage axis 112. In some such examples, and also as schematically represented in FIG. 4, the adjustment mechanism 116 comprises a first nut (or internal threaded member) 118 that is fixed relative to the adjustment-member axis 110, a second nut (or internal threaded member) 120 that is fixed relative to the linkage axis 112, and a threaded rod 122 that is operatively engaged with the first nut 118 and the second nut 120. Rotation of the threaded rod 122 in a first direction shortens the direct distance 114 between the adjustment-member axis 110 and the linkage axis 112, while rotation of the threaded rod 122 in a second direction opposite the first direction lengthens the direct distance 114 between the adjustment-member axis 110 and the linkage axis 112.

As schematically represented in FIG. 4, in some examples, the track member 104 defines an elongate slot 124, and the gap-adjustment assembly 102 comprises a follower 126 that is operatively coupled to the slat 22 and that is configured to translate along the elongate slot 124; however, other configurations of track members 104 and followers 126 may be used.

In some examples, wherein the follower 126 comprises a roller 128 that defines a roller axis 130, and in some such examples, the roller axis 130 is parallel to the linkage axis 112. In some examples, the elongate slot 124 is nonlinear, as schematically represented in FIG. 4, such as to define a desired path of travel of the slat 22 between the stowed position 26 and the deployed position 28.

In some examples, the track-member axis 106, the adjustment-member axis 110, and the linkage axis 112 are parallel to each other. In such examples, the track member 108 and the adjustment member 104 pivot within parallel planes; however, other geometries also may be defined by gap-adjustment assemblies 102.

Turning now to FIGS. 5-10, an illustrative non-exclusive example of a wing assembly 100, designated as wing assembly 200, is illustrated. Where appropriate, the reference numerals from the schematic illustration of FIGS. 1-4 are used to designate corresponding parts of the wing assembly 200; however, the example of FIGS. 5-10 is non-exclusive and does not limit wing assemblies 100 to the illustrated embodiment of wing assembly 200. That is, wing assemblies 100 are not limited to the specific embodiments of the illustrated wing assembly 200, and wing assemblies 100 may incorporate any number of the various aspects, configurations, characteristics, properties, etc. of wing assemblies 100 that are illustrated in and discussed with reference to the schematic representations of FIGS. 1-4 and/or the embodiment of FIGS. 5-10, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the wing assembly 200; however, it is within the scope of the present disclosure that the previously discussed features, variants, etc. may be utilized with the wing assembly 200.

Figure 5:
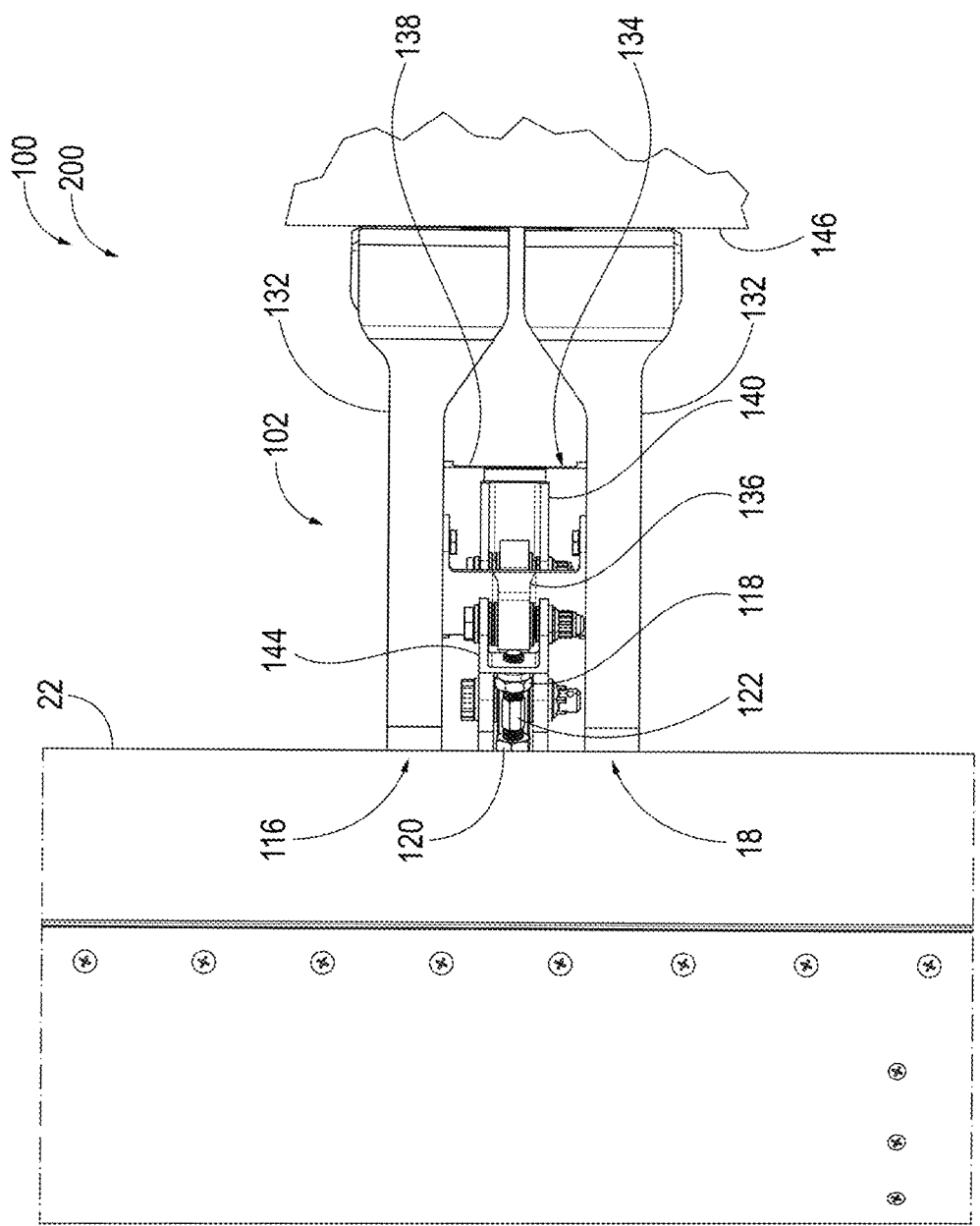
FIG. 5 is a top view of an example wing assembly according to the present disclosure, with the slat in the stowed position.
Figure 6:
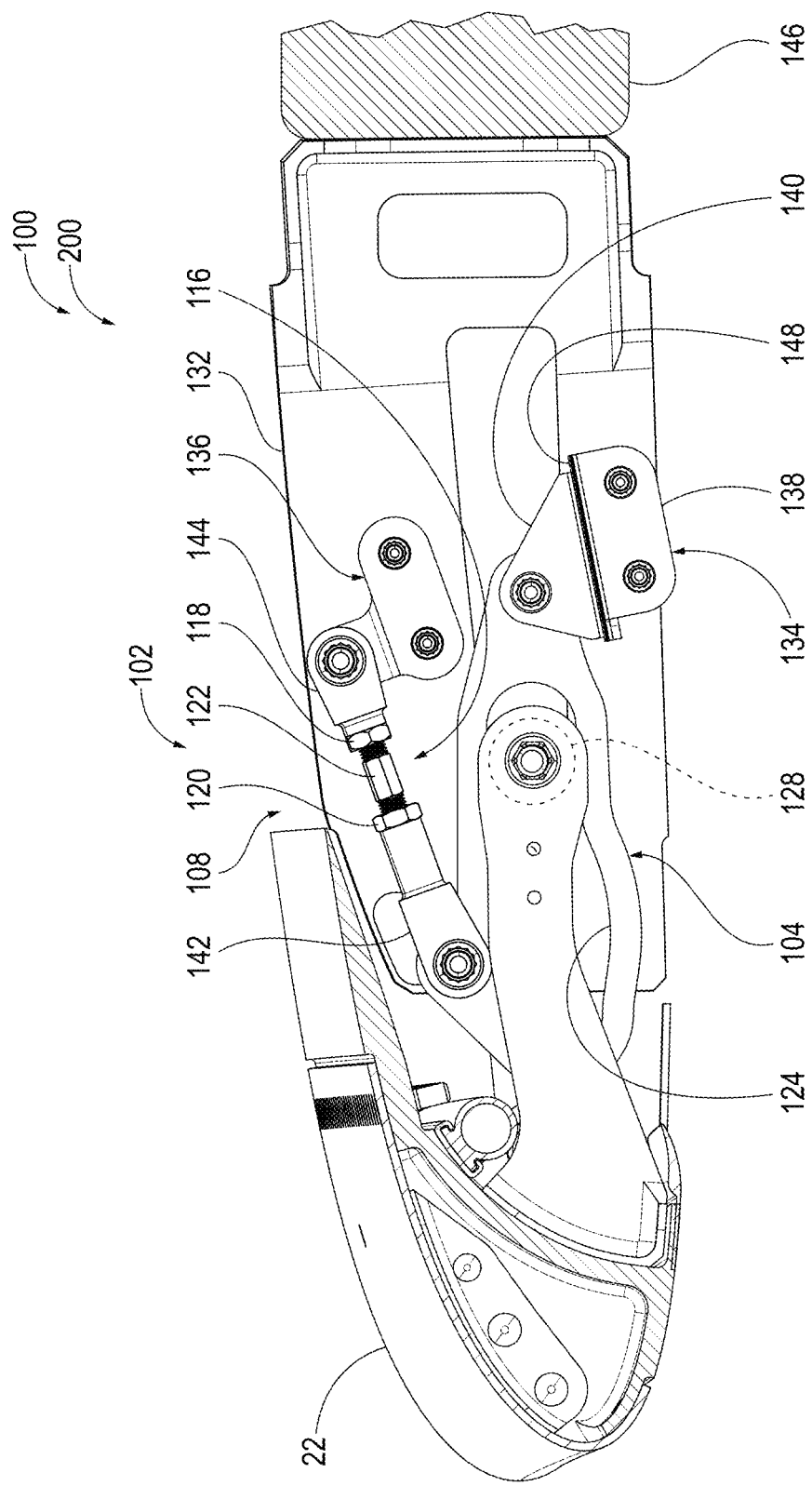
FIG. 6 is a fragmentary side view of the example wing assembly of FIG. 5, with the slat in the stowed position.

FIGS. 5 and 6 illustrate the wing assembly 200 with the slat 22 in the stowed position 26, while FIGS. 7-10 illustrate the wing assembly 200 with the slat 22 in the deployed position 28. As perhaps best seen in FIG. 8, the wing assembly 200 is an example of a wing assembly 100 that whose adjustment member 108 comprises an adjustment mechanism 116 that comprises a first nut 118, a second nut 120, and a threaded rod 122 that is operatively engaged with the first nut 118 and the second nut 120, such that selective rotation of the threaded rod 122, such as by an aircraft technician, will adjust the direct distance 114 between the adjustment-member axis 110 and the linkage axis 112.

Figure 8:
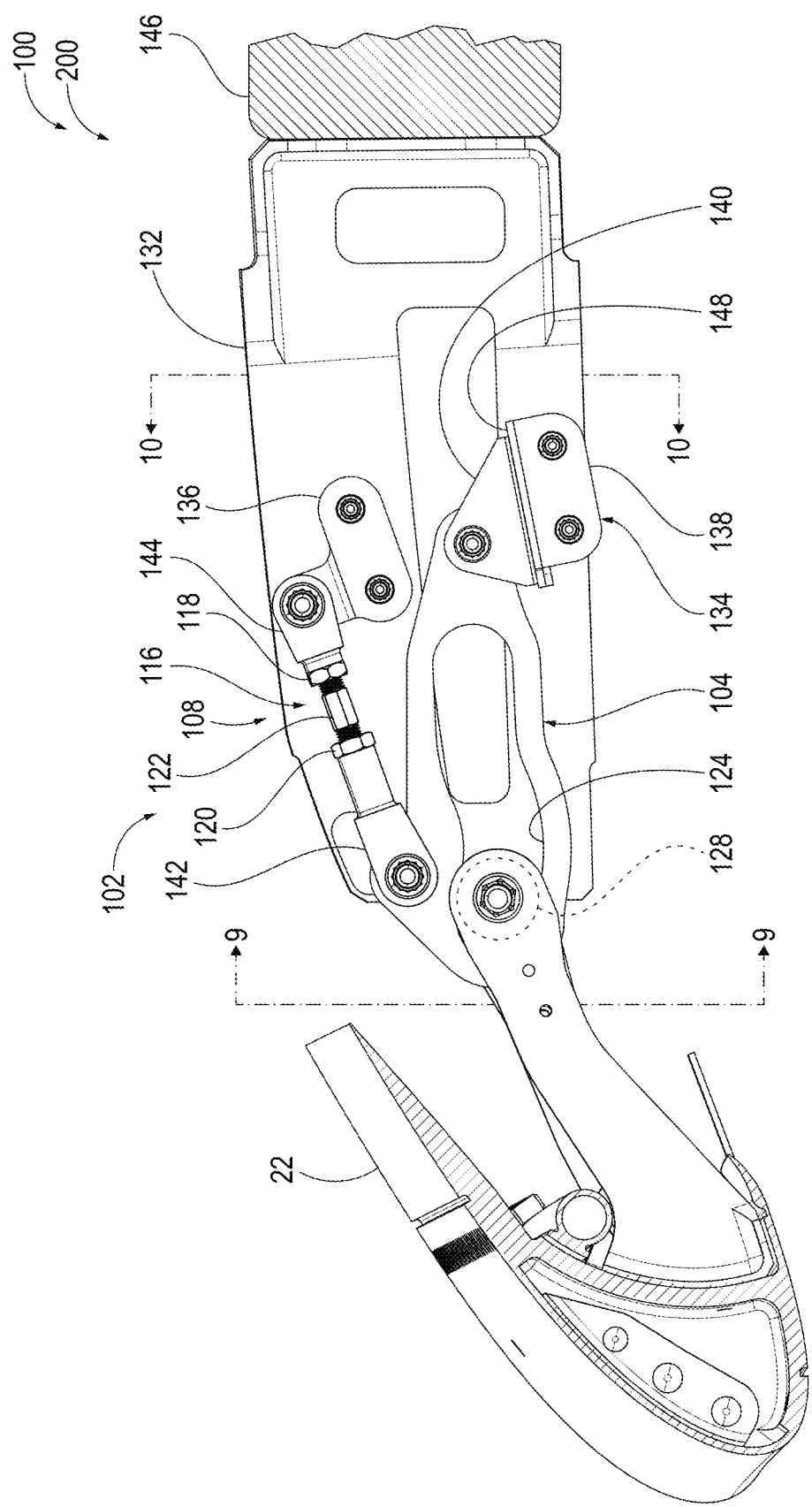
FIG. 8 is a fragmentary side view of the example wing assembly of FIG. 5, with the slat in the deployed position.
Figure 9:
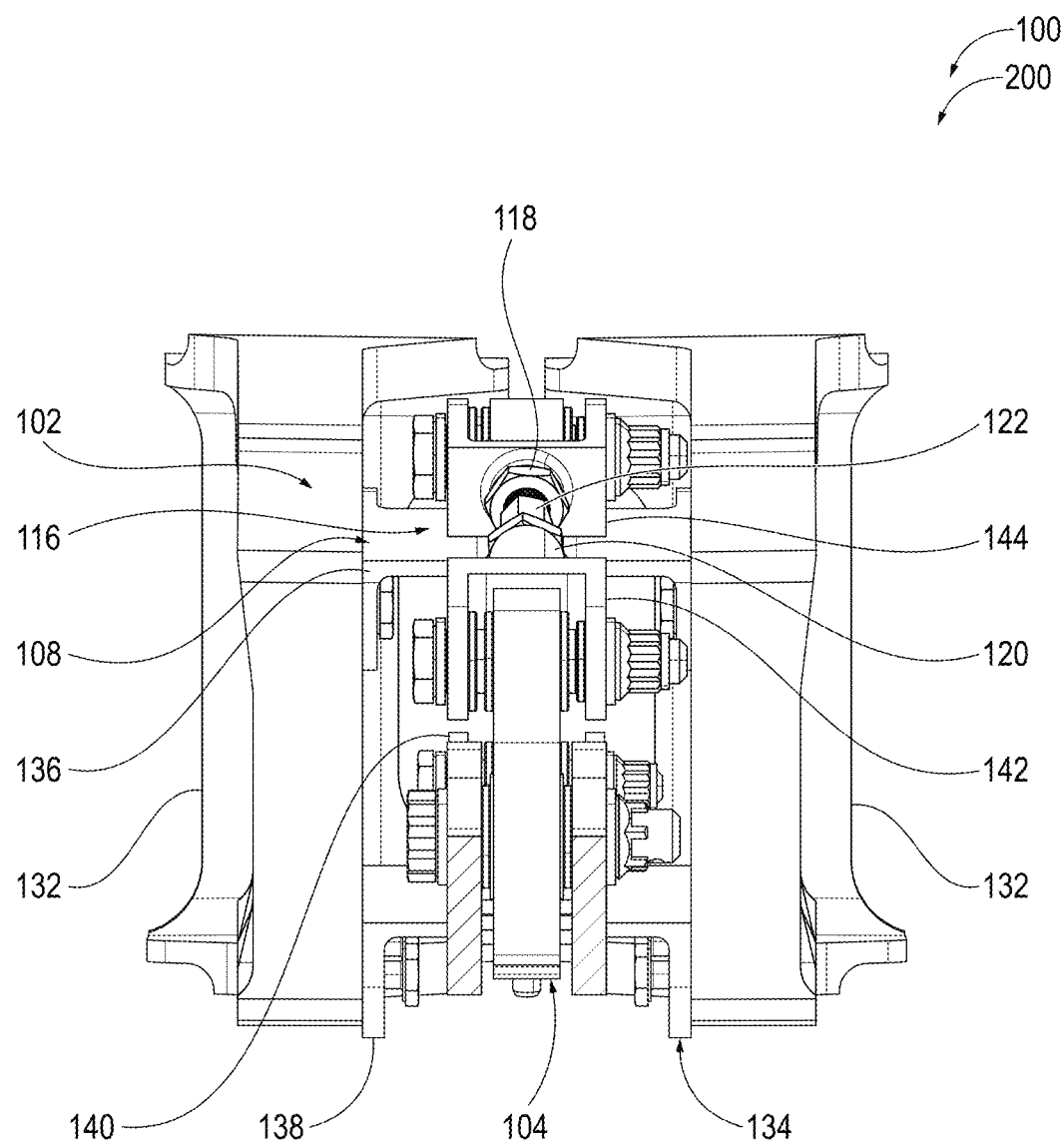
FIG. 9 is a fragmentary front view of the example wing assembly of FIG. 5, with the slat in the deployed position, corresponding to view 9-9 in FIG. 8.
Figure 10:
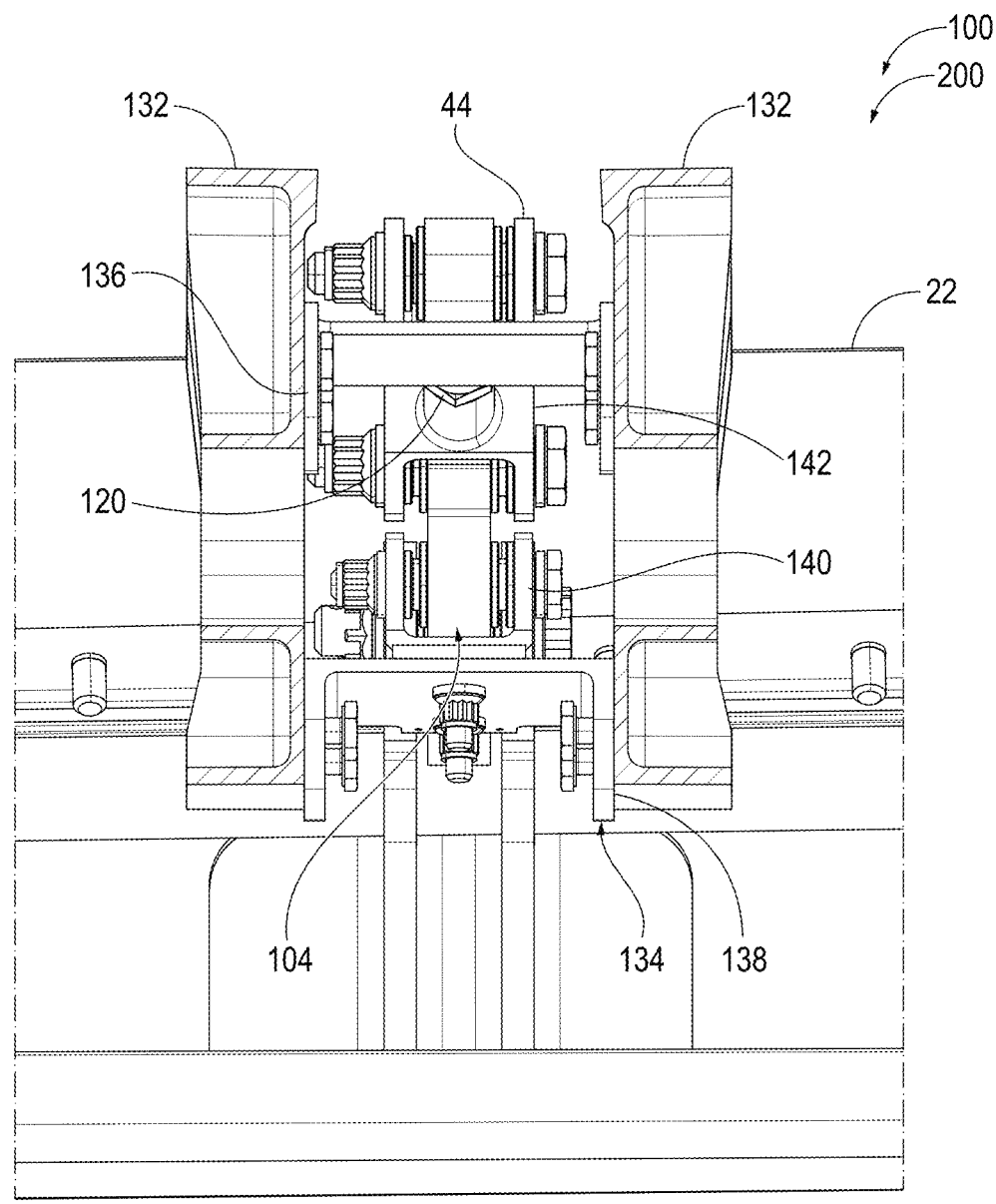
FIG. 10 is a fragmentary rear view of the example wing assembly of FIG. 5, with the slat in the deployed position, corresponding to view 10-10 in FIG. 8.

As seen in FIGS. 6 and 8, the wing assembly 200 also is an example of a wing assembly 100 whose track member 104 comprises an elongate slot 124 and whose gap-adjustment assembly 102 comprises a roller 128 that is configured to roll along the elongate slot 124.

Figure 7:
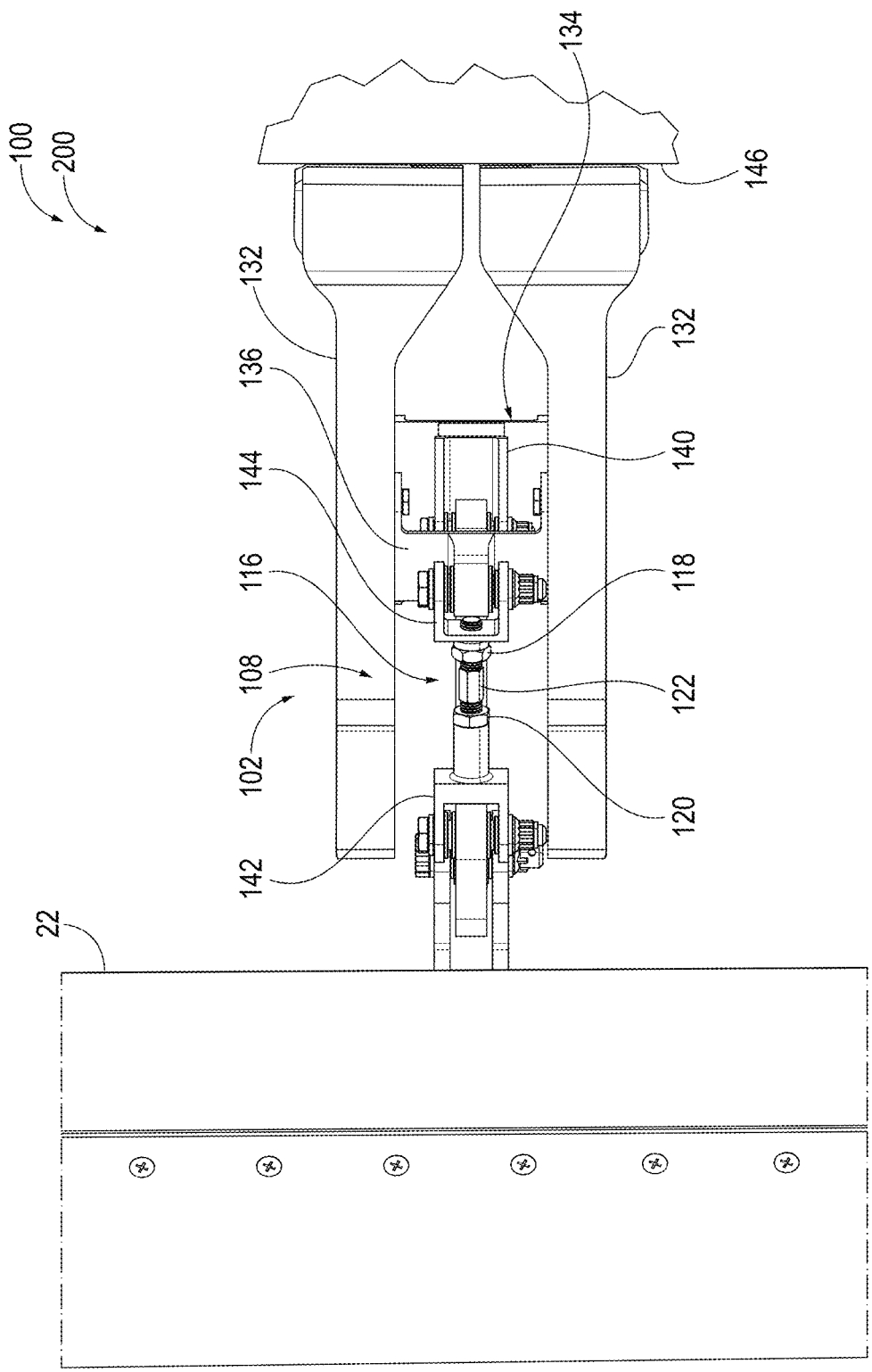
FIG. 7 is a top view of the example wing assembly of FIG. 5, with the slat in the deployed position.

In addition, as best seen in FIGS. 5 and 7, the gap-adjustment assembly 102 of the wing assembly 200 comprises a pair of auxiliary ribs 132 that are fixed to a forward-most spar 146. Additionally or alternatively, the auxiliary ribs 132 may be described as wing support structures 24 and/or the wing support structure 24 may be described as comprising the auxiliary ribs 132. As best seen in FIGS. 6 and 8, the gap-adjustment assembly 102 of the wing assembly 200 further comprises a track support 134 and an adjustment-member support 136. The track support 134 is fixed to and between the auxiliary ribs 132 and operatively and pivotally supports the track member 104. The adjustment-member support 136 is fixed to and between the auxiliary ribs 132 and operatively and pivotally supports the adjustment member 108.

As best seen in FIGS. 6 and 8-10, in the wing assembly 200, the track support 134 comprises a lower clevis 138 that is fixed to and between the pair of auxiliary ribs 132, and an upper clevis 140 that is fixed to the lower clevis 138 and that operatively and pivotally supports the track member 104. Although not required in all wing assemblies 100, in the example of wing assembly 200, the lower clevis 138 and the upper clevis 140 are configured to be selectively spaced apart from each other by one or more shims 148. That is, an aircraft technician may install or remove one or more shims 148 to set a desired location of the track-member axis 106 relative to the wing support structures 24.

As best seen in FIGS. 6 and 8, in the wing assembly 200, the adjustment member 108 comprises a forward clevis 142 that is pivotally coupled to the track member 104 and a rearward clevis 144 that is pivotally coupled to the adjustment-member support 136.

Illustrative, non-exclusive examples of inventive subject matter according to the present disclosure are described in the following enumerated paragraphs:

A. A wing assembly (100), comprising:
a slat (22);
wing support structures (24); and
a gap-adjustment assembly (102) configured to permit selective adjustment of the slat (22) relative to the wing support structures (24), wherein the gap-adjustment assembly (102) comprises:
    a track member (104) pivotally coupled relative to the wing support structures (24) about a track-member axis (106), wherein the slat (22) is operatively translationally coupled to the track member (104), and wherein the track member (104) is configured to constrain translation of the slat (22) between a stowed position (26) and a deployed position (28); and
    an adjustment member (108) pivotally coupled relative to the wing support structures (24) about an adjustment-member axis (110) and pivotally coupled to the track member (104) about a linkage axis (112), wherein the adjustment member (108) is configured to permit selective adjustment of a direct distance (114) between the adjustment-member axis (110) and the linkage axis (112).

A1. The wing assembly (100) of paragraph A, wherein the gap-adjustment assembly (102) is further configured to permit selective adjustment of a location of the track-member axis (106) relative to the wing support structures (24).

A2. The wing assembly (100) of any of paragraphs A-A1, wherein the adjustment member (108) comprises an adjustment mechanism (116) configured to permit selective adjustment of the direct distance (114) between the adjustment-member axis (110) and the linkage axis (112).

A2.1. The wing assembly (100) of paragraph A2, wherein the adjustment mechanism (116) comprises:
a first nut (118) fixed relative to the adjustment-member axis (110);
a second nut (120) fixed relative to the linkage axis (112); and
a threaded rod (122) operatively engaged with the first nut (118) and the second nut (120), wherein rotation of the threaded rod (122) in a first direction shortens the direct distance (114) between the adjustment-member axis (110) and the linkage axis (112), and wherein rotation of the threaded rod (122) in a second direction opposite the first direction lengthens the direct distance (114) between the adjustment-member axis (110) and the linkage axis (112).

A3. The wing assembly (100) of any of paragraphs A-A2.1,
wherein the track member (104) defines an elongate slot (124); and
wherein the gap-adjustment assembly (102) further comprises a follower (126) operatively coupled to the slat (22) and configured to translate along the elongate slot (124).

A3.1 The wing assembly (100) of paragraph A3, wherein the follower (126) comprises a roller (128) that defines a roller axis (130).

A3.1.1. The wing assembly (100) of paragraph A3.1, wherein the roller axis (130) is parallel to the linkage axis (112).

A3.2. The wing assembly (100) of any of paragraphs A3-A3.1.1, wherein the elongate slot (124) is nonlinear.

A4. The wing assembly (100) of any of paragraphs A-A3.2, wherein the track-member axis (106), the adjustment-member axis (110), and the linkage axis (112) are parallel to each other.

A5. The wing assembly (100) of any of paragraphs A-A4, wherein the gap-adjustment assembly (102) further comprises:
an auxiliary rib (132) fixed to the wing support structures (24);
a track support (134) fixed to the auxiliary rib (132) and operatively and pivotally supporting the track member (104); and
an adjustment-member support (136) fixed to the auxiliary rib (132) and operatively and pivotally supporting the adjustment member (108).

A5.1. The wing assembly (100) of paragraph A5,
wherein the gap-adjustment assembly (102) comprises a pair of auxiliary ribs (132); and
wherein the track support (134) is fixed to and between the pair of auxiliary ribs (132).

A5.1.1. The wing assembly (100) of paragraph A5.1, wherein the track support (134) comprises:
a lower clevis (138) fixed to and between the pair of auxiliary ribs (132); and
an upper clevis (140) fixed to the lower clevis (138) and operatively and pivotally supporting the track member (104).

A5.1.1.1. The wing assembly (100) of paragraph A5.1.1 when depending from paragraph A1, wherein the lower clevis (138) and the upper clevis (140) are configured to be selectively spaced apart from each other by one or more shims (148).

A5.2. The wing assembly (100) of any of paragraphs A5-A5.1.1.1,
wherein the gap-adjustment assembly (102) comprises a/the pair of auxiliary ribs (132); and
wherein the adjustment-member support (136) is fixed to and between the pair of auxiliary ribs (132).

A5.3. The wing assembly (100) of any of paragraphs A5-A5.2, wherein the adjustment member (108) comprises:
a forward clevis (142) pivotally coupled to the track member (104); and
a rearward clevis (144) pivotally coupled to the adjustment-member support (136).

A6. An aircraft (10), comprising:
a fuselage (16);
a wing (12) supported by the fuselage (16), wherein the wing (12) comprises the wing assembly (100) of any of paragraphs A-A5.3.

A7. Use of the wing assembly (100) of any of paragraphs A-A5.3 to adjust a position of the slat (22) in the deployed position (28).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A wing assembly, comprising:
a slat;
wing support structures; and
a gap-adjustment assembly configured to permit selective adjustment of the slat relative to the wing support structures, wherein the gap-adjustment assembly comprises:
  a track member pivotally coupled relative to the wing support structures about a track-member axis, wherein the slat is operatively translationally coupled to the track member, and wherein the track member is configured to constrain translation of the slat between a stowed position and a deployed position; and
  an adjustment member pivotally coupled relative to the wing support structures about an adjustment-member axis and pivotally coupled to the track member about a linkage axis, wherein the adjustment member is configured to permit selective adjustment of a direct distance between the adjustment-member axis and the linkage axis.

2. The wing assembly of claim 1, wherein the gap-adjustment assembly is further configured to permit selective adjustment of a location of the track-member axis relative to the wing support structures.

3. The wing assembly of claim 1, wherein the adjustment member comprises an adjustment mechanism configured to permit selective adjustment of the direct distance between the adjustment-member axis and the linkage axis.

4. The wing assembly of claim 3, wherein the adjustment mechanism comprises:
a first nut fixed relative to the adjustment-member axis;
a second nut fixed relative to the linkage axis; and
a threaded rod operatively engaged with the first nut and the second nut, wherein rotation of the threaded rod in a first direction shortens the direct distance between the adjustment-member axis and the linkage axis, and wherein rotation of the threaded rod in a second direction opposite the first direction lengthens the direct distance between the adjustment-member axis and the linkage axis.

5. The wing assembly of claim 1,
wherein the track member defines an elongate slot; and
wherein the gap-adjustment assembly further comprises a follower operatively coupled to the slat and configured to translate along the elongate slot.

6. The wing assembly of claim 5, wherein the follower comprises a roller that defines a roller axis.

7. The wing assembly of claim 6, wherein the roller axis is parallel to the linkage axis.

8. The wing assembly of claim 5, wherein the elongate slot is nonlinear.

9. The wing assembly of claim 1, wherein the track-member axis, the adjustment-member axis, and the linkage axis are parallel to each other.

10. The wing assembly of claim 1, wherein the gap-adjustment assembly further comprises:
an auxiliary rib fixed to the wing support structures;
a track support fixed to the auxiliary rib and operatively and pivotally supporting the track member; and
an adjustment-member support fixed to the auxiliary rib and operatively and pivotally supporting the adjustment member.

11. The wing assembly of claim 10
wherein the gap-adjustment assembly comprises a pair of auxiliary ribs; and
wherein the track support is fixed to and between the pair of auxiliary ribs.

12. The wing assembly of claim 11, wherein the track support comprises:
a lower clevis fixed to and between the pair of auxiliary ribs; and
an upper clevis fixed to the lower clevis and operatively and pivotally supporting the track member.

13. The wing assembly of claim 12
wherein the gap-adjustment assembly is further configured to permit selective adjustment of a location of the track-member axis relative to the wing support structures; and
wherein the lower clevis and the upper clevis are configured to be selectively spaced apart from each other by one or more shims.

14. The wing assembly of claim 10,
wherein the gap-adjustment assembly comprises a pair of auxiliary ribs; and
wherein the adjustment-member support is fixed to and between the pair of auxiliary ribs.

15. The wing assembly of claim 10, wherein the adjustment member comprises:
a forward clevis pivotally coupled to the track member; and
a rearward clevis pivotally coupled to the adjustment-member support.

16. An aircraft, comprising:
a fuselage;
a wing supported by the fuselage, wherein the wing comprises the wing assembly of claim 1.

17. A wing assembly, comprising:
a slat;
wing support structures; and
a gap-adjustment assembly configured to permit selective adjustment of the slat relative to the wing support structures, wherein the gap-adjustment assembly comprises:

a track member pivotally coupled relative to the wing support structures about a track-member axis, wherein the slat is operatively translationally coupled to the track member, wherein the track member is configured to constrain translation of the slat between a stowed position and a deployed position, wherein the track member defines an elongate slot, and wherein the elongate slot is nonlinear;

an adjustment member pivotally coupled relative to the wing support structures about an adjustment-member axis and pivotally coupled to the track member about a linkage axis, wherein the track-member axis, the adjustment-member axis, and the linkage axis are parallel to each other, wherein the adjustment member is configured to permit selective adjustment of a direct distance between the adjustment-member axis and the linkage axis, wherein the adjustment member comprises an adjustment mechanism configured to permit selective adjustment of the direct distance between the adjustment-member axis and the linkage axis, and wherein the adjustment mechanism comprises:

a first nut fixed relative to the adjustment-member axis;

a second nut fixed relative to the linkage axis; and a threaded rod operatively engaged with the first nut and the second nut, wherein rotation of the threaded rod in a first direction shortens the direct distance between the adjustment-member axis and the linkage axis, and wherein rotation of the threaded rod in a second direction opposite the first direction lengthens the direct distance between the adjustment-member axis and the linkage axis; and a follower operatively coupled to the slat and configured to translate along the elongate slot, wherein the follower comprises a roller that defines a roller axis, and wherein the roller axis is parallel to the linkage axis.

18. The wing assembly of claim 17, wherein the gap-adjustment assembly further comprises:

an auxiliary rib fixed to the wing support structures;

a track support fixed to the auxiliary rib and operatively and pivotally supporting the track member; and an adjustment-member support fixed to the auxiliary rib and operatively and pivotally supporting the adjustment member.

19. A wing assembly, comprising:

a slat;

wing support structures; and a gap-adjustment assembly configured to permit selective adjustment of the slat relative to the wing support structures, wherein the gap-adjustment assembly comprises:

a track member pivotally coupled relative to the wing support structures about a track-member axis, wherein the slat is operatively translationally coupled to the track member, wherein the track member is configured to constrain translation of the slat between a stowed position and a deployed position, wherein the track member defines an elongate slot, and wherein the elongate slot is nonlinear;

an adjustment member pivotally coupled relative to the wing support structures about an adjustment-member axis and pivotally coupled to the track member about a linkage axis, wherein the track-member axis, the adjustment-member axis, and the linkage axis are parallel to each other, wherein the adjustment member is configured to permit selective adjustment of a direct distance between the adjustment-member axis and the linkage axis, wherein the adjustment member comprises an adjustment mechanism configured to permit selective adjustment of the direct distance between the adjustment-member axis and the linkage axis, and wherein the adjustment mechanism comprises:

a first nut fixed relative to the adjustment-member axis;

a second nut fixed relative to the linkage axis; and a threaded rod operatively engaged with the first nut and the second nut, wherein rotation of the threaded rod in a first direction shortens the direct distance between the adjustment-member axis and the linkage axis, and wherein rotation of the threaded rod in a second direction opposite the first direction lengthens the direct distance between the adjustment-member axis and the linkage axis;

a follower operatively coupled to the slat and configured to translate along the elongate slot, wherein the follower comprises a roller that defines a roller axis, and wherein the roller axis is parallel to the linkage axis; and a pair of auxiliary ribs;

a track support fixed to and between the pair of auxiliary ribs and operatively and pivotally supporting the track member, wherein the track support comprises a lower clevis fixed to and between the pair of auxiliary ribs an upper clevis fixed to the lower clevis and operatively and pivotally supporting the track member; and an adjustment-member support fixed to and between the pair of auxiliary ribs and operatively and pivotally supporting the adjustment member, and wherein the adjustment member comprises a forward clevis pivotally coupled to the track member and a rearward clevis pivotally coupled to the adjustment-member support.

20. An aircraft, comprising:

a fuselage;

a wing supported by the fuselage, wherein the wing comprises the wing assembly of claim 19.

* * * * *